United States Patent [19]

Krishnan

[11] Patent Number: 4,669,517

[45] Date of Patent: Jun. 2, 1987

[54] POLYURETHANE BONDED TO CURED RUBBER CONTAINING A DIENE POLYOL

[75] Inventor: Ram M. Krishnan, Stow, Ohio

[73] Assignee: The Goodyear Tire & Rubber Company, Akron, Ohio

[21] Appl. No.: 587,107

[22] Filed: Mar. 7, 1984

[51] Int. Cl.$^4$ ............................................... B60C 1/00
[52] U.S. Cl. ............................. 152/209 R; 152/564; 152/565; 156/125; 156/308.8; 156/316
[58] Field of Search ............. 156/308.2, 308.6, 308.8, 156/314, 316, 335, 910, 125; 152/330 R, 209 R, 357 A, 374, 452, 564, 565, 450

[56] References Cited

U.S. PATENT DOCUMENTS

| | | | |
|---|---|---|---|
| 2,749,960 | 6/1956 | Schwartz | 152/452 |
| 3,528,473 | 9/1970 | Torti et al. | 152/374 |
| 4,006,767 | 2/1977 | Ford | 152/452 |

FOREIGN PATENT DOCUMENTS 0101660  2/1984  European Pat. Off. .

OTHER PUBLICATIONS

Ono et al., "Fluidity of Compounds of Liquid Rubber", *International Polymer Science and Technology*, vol. 10, No. 8, 1983.

Stefanides "Bonding Agent Allows Assembly of Composite Skateboard Wheel," *Design News*, Apr. 6, 1981, pp. 210–211.

Arco Chemical Company, Poly bd Liquid Resins, Jan., 1978.

Hughson Chemical Company, Chemlock 218 Product Bulletin, 1966.

Lord Hughson Chemicals, Chemlok 7701 Product Bulletin, 1979 and Chemlok 218 Product Bulletin 2026c.

*Primary Examiner*—Michael Ball
*Attorney, Agent, or Firm*—H. C. Young, Jr.

[57] ABSTRACT

A method of preparing a composite of polyurethane bonded to the surface of a cured rubber substrate and the resulting composite. The method requires the rubber substrate to contain an hydroxyl terminated polybutadiene polyol. The method is practiced by first applying to a cleaned, cured rubber surface containing the polybutadiene polyol a coating of cyanuric acid followed by an additional coating of a phenol formaldehyde resin and then applying a liquid polyurethane reaction mixture which is cured to form the resultant composite. The invention is particularly directed to the preparation of a tire comprised of a polyurethane carcass applied to a cured rubber tread and to a tire comprised of a polyurethane tread applied to a cured rubber carcass.

4 Claims, No Drawings

4,669,517

POLYURETHANE BONDED TO CURED RUBBER CONTAINING A DIENE POLYOL

FIELD

This invention relates to a method of preparing a composite of polyurethane bonded to cured rubber through an adhesive interface. The invention further relates to such prepared composite. The invention particularly relates to a method of preparing a composite of tire comprised of a polyurethane tire carcass bonded to a cured rubber tread. The invention further relates to a composite of a tire comprised of a polyurethane tread bonded to a cured rubber tire carcass.

BACKGROUND

It is sometimes desired to prepare composites of polyurethane bonded to cured rubber for various purposes, particularly where it is desired to obtain the advantages of the properties each or both of such materials in an individual application.

For example, it may be desired to provide a vehicular tire with a rubber carcass having an outer circumferential tread of polyurethane.

It may also be desired to provide a vehicular tire with a cured rubber tread and a polyurethane carcass.

Additionally, other products, including various industrial products may be desired as laminates of cured rubber and polyurethane.

However, particularly for such composites which are normally expected to experience a considerable amount of flexing, compression and various degrees of distortion during their use, an important point of early failure can be the interface between the cured rubber substrate and the polyurethane.

Although the relationship between the two types of materials is complex and depends upon many factors, it is important to appreciate that effectively adhering a relatively polar (high surface energy) polyurethane substance to the surface of a relatively non-polar (low surface energy) cured rubber substrate can be difficult.

Various adhesive systems have been tried and sometimes suggested for such purpose. However, for many applications, the resulting bond strengths are simply insufficient to provide an effective composite laminate which will not easily delaminate under extensive working conditions.

Therefore, it is an aspect of this invention to provide a composite of a polyurethane bonded to the surface of a cured rubber substrate.

SUMMARY AND OPERATION

In accordance with this invention, a method of preparing a composite of a polyurethane bonded to a surface of a cured rubber substrate comprises the steps of (A) cleaning a surface of a cured rubber substrate prepared by sulfur curing a rubber composition containing about 2 to about 20, preferably about 8 to about 12, phr of at least one hydroxyl terminated diene polyol selected from polybutadiene polyol and polyisoprene polyol, where said polyol is characterized by being liquid at 30° C., by having a hydroxyl functionality of about 1.5 to about 3, preferably about 2 to about 2.5 and a molecular weight in the range of about 2000 to about 4000, preferably about 2500 to about 3200; and where said rubber composition further contains about 0 to about 25, preferably about 0 to about 20 and optionally about 5 to about 20, phr of rubber processing oil.

(B) Applying at least one coating to said cleaned substrate surface as a dispersion of cyanuric acid in a volatile organic diluent and drying the resultant coat to remove said diluent.

(C) Applying at least one additional overcoat to the said cyanuric acid coat as a solution comprising a phenol formaldehyde resole resin in a volatile organic solvent and drying the resultant additional overcoat to remove the solvent.

(D) Applying a liquid polyurethane reaction mixture to said coated substrate surface.

(E) Curing said reaction mixture to form a composite of polyurethane bonded to cured rubber substrate through said sequentially applied coatings.

In further accordance with this invention, a composite is provided comprised of polyurethane bonded to a cured rubber substrate prepared by such method.

It is important to appreciate that the cured rubber substrate also contains conventional rubber compounding ingredients including carbon black, zinc oxide, a stearate such as zinc stearate, sulfur and antidegradants.

In further accordance with this invention, a composite is provided comprised of polyurethane bonded to a cured rubber substrate prepared by such method.

It is important that the surface of the cured rubber substrate is cleaned prior to application of the cyanuric acid solution in order to remove surface oils and other foreign substances which may be present. The purpose is to provide a fresh, exposed rubber surface substantially free from typical surface oils and other contaminants.

The cleaning of the cured rubber surface can be done by various means such as by organic solvent washing, aqueous soap solution washing, abrading or a combination thereof. If the organic solvent or aqueous soap solution method is used, the treated surface is dried before application of the cyanuric acid solution. Abrading of the rubber surface can be accomplished by various means such as by buffing with wire wheel, abrasive grinding wheel or shot blast treatment to abrade away a part of the surface to leave it both clean and roughened. A roughened rubber surface apparently tends to aid in improving adhesion in the practice of this invention.

In practice, usually the surface is first abraded, such as by buffing, and then washed with an organic solvent. Typically such solvents might be, for example, methylene chloride or methyl ethyl ketone. All of these are well-known methods of cleaning cured rubber surfaces to those having skill in such art.

A particular application of this invention is the preparation of a tire having a polyurethane carcass applied to a cured rubber tread. For such tire, the rubber tread is first pre-formed and cured as a circular element which is intended to become a peripheral, circumferential portion of the tire.

For such application, a composite in the form of a tire is prepared by the steps of (A) Obtaining a cured rubber tire tread composed of an outer rubber tread portion and an inner, exposed rubber portion, where said inner rubber portion is prepared by sulfur curing a rubber composition containing about 2 to about 20, preferably about 8 to about 12, phr of at least one hydroxyl terminated diene polyol selected from polybutadiene polyol and polyisoprene polyol, where said polyol is characterized by being liquid at 30° C., by having a hydroxyl functionality of about 1.5 to about 3.0, preferably about 2 to about 2.5 and a molecular weight in the range of about 2000 to about 4000, preferably about 2500 to about 3200; and where said rubber composition further contains about 0 to about 25, preferably about 0 to about 20 and optionally about 5 to about 20, phr of rubber processing oil.

(B) Cleaning the inner surface of said inner tread portion.

(C) Applying at least one coating to said cleaned inner tread surface of a dispersion of cyanuric acid in a volatile organic diluent and drying the resultant coat.

(D) Applying at least one additional coating to said coated surface as a solution comprising a phenol formaldehyde resole resin in a volatile organic solvent and drying the resultant coat.

(E) Applying a liquid polyurethane reaction mixture to said coated surface in a molding environment having the shape of a desired tire carcass.

(F) Curing said reaction mixture in said molding environment to form said composite as a polyurethane tire carcass bonded to a cured rubber tread through said sequentially applied coatings.

In further accordance with this invention, a tire is provided which comprises a polyurethane tread bonded to a cured rubber carcass prepared according to such method.

In the practice of this invention it is preferred that the said inner rubber portion of the tread is fabric reinforced with a textile woven fabric imbedded therein such as, for example, a tire cord fabric. Such fabric can be of various filaments and/or yarns such as, for example, polyester, nylon, aramid, glass and metal such as steel. A primary purpose of such reinforcement is to restrict growth in diameter of the tread during its use as a component of the resultant tire composite and to generally add strength to the tread structure.

An additional application of this invention is the preparation of a composite as a tire having a polyurethane tread applied circumferentially to the periphery of a cured rubber tire carcass.

For such application, a composite in the form of a tire is prepared by the steps of (A) Obtaining a toroidally shaped cured rubber tire carcass, said carcass having a circumferential, outer, exposed rubber portion where said rubber portion is prepared by sulfur curing a rubber composition containing containing about 2 to about 20, preferably about 8 to about 12, phr of at least one hydroxyl terminated characterized by being liquid at 30° C., by having a hydroxyl functionality of about 1.5 to about 3.0, preferably about 2 to about 2.5 and a molecular weight in the range of about 2000 to about 4000, preferably about 2500 to about 3200: and where said rubber composition further contains about 0 to about 25, preferably about 0 to about 20 and optionally about 5 to about 20 phr of rubber processing oil.

(B) Cleaning the said outer, exposed surface of the outer rubber portion of said carcass.

(C) Applying at least one coating to said cleaned outer carcass surface as a dispersion of cyanuric acid in a volatile organic diluent and drying the resultant coat.

(D) Applying at least one additional coating to said coated surface as a solution comprising a phenol formaldehyde resole resin in a volatile organic solvent and drying the resultant coat.

(E) Applying a liquid polyurethane reaction mixture to said coated surface of the carcass in a molding environment having the shape of a desired tire tread.

(F) Curing said reaction mixture in said molding environment to form said composite as a polyurethane tread bonded to a cured rubber tire carcass through said sequentially applied coats.

In practice, it may often be desired that the edges of the tread extend over a portion of the sidewall of the carcass adjacent to the tread.

In further accordance with this invention, a tire is provided which comprises a polyurethane carcass bonded to a cured rubber tread prepared according to such method.

The cured rubber substrate is described as being required to be prepared by sulfur curing a rubber composition containing a hydroxyl terminated diene polyol.

In the practice of this invention, the preferred diene polyol is polybutadiene polyol.

The diene polyol is characterized as a liquid at 30° C. Thus, for example, the diene polyol may be a pourable, or castable, polybutadiene polyol having a viscosity of about 50 poise at 30° C.

The diene polyol is also characterized by having a hydroxyl functionality range and molecular weight range. The diene polyol can more specifically be described, for example, as having terminal hydroxyl groups which are essentially primary hydroxyl groups. They may be predominantly of the allylic type. The polyol may contain secondary hydroxyl groups in its structure in addition to its terminal primary hydroxyl groups and thus may have a hydroxyl functionality greater than two. Although the diene polyol is broadly described as having a hydroxyl functionality of about 1.5 (less than 2) to about 3, preferably its hydroxyl functionality is at least 2. The polybutadiene polyol may have a structure composed of, for example, about 50 to about 70 percent trans 1,4-, 10 to about 30 percent cis 1,4- and about 10 to about 30 percent vinyl 1,2- structure. Thus the polybutadiene polyol may be primarily of a trans 1,4-structure. Such polyol might conveniently be prepared, for example, by the free radical polymerization monomers in a chain termination type reaction of a monomer system containing 1,3-butadiene and a diol and triol mixture, comprised of about 50 to about 70 percent of a monomer diol containing two primary allylic hydroxyl groups and, correspondingly, about 30 to about 50 percent of a monomeric triol containing two primary hydroxyl groups and a third secondary hydroxyl group in its backbone. An initiator can be used to effect the chain terminating polymerization reaction.

The cured rubber substrate is also described as being required to contain about 0 to about 25, preferably about 0 to about 20 and optionally about 5 to about 20 phr of rubber processing oil. Many, and indeed most, cured rubber formulations contain a rubber processing oil and this amount of oil is not considered as being particularly unusual, although some compounds may contain more oil. The more specific oil limitation is placed on the rubber substrate to which the coatings are applied because in the practice of this invention, it has been observed that a better bond is obtained if the amount of oil in the rubber is somewhat limited. The optional range of 5–20 phr of oil is provided where as often may be the case, a level or minimum amount of oil may be desired or required in the rubber for various physical property purposes.

The practice of this invention is described as being particularly applicable to the preparation of tires. Such tires are described as being constructed of an outer circumferential tread and a carcass. As will be readily known and observed by one having skill in the tire art, the outer portion of the tread is adapted to be surface contacting such as for example, ground contacting, its inner portion faces and joins the carcass which provides support for the tread. The carcass can be composed of various elements and can contain reinforcement such as a fabric reinforcement.

The tire carcass is referred as being generally toroidal shaped which is the conventional shape of a tire and is intended to include the typical open toroid tire carcass configuration.

In the practice of this invention, the cyanuric acid is applied to the cleaned cured rubber substrate as a dispersion in an organic diluent. It is to be understood that a portion of the cyanuric acid may, dissolve in the diluent and thus form a solution. The term "dispersion" is intended to describe the dispersion of the cyanuric acid in the diluent which may also contain and include the cyanuric acid in the form of a solution. For this purpose, various organic diluents can be used, although it is preferred as a limitation, that such solvents do not unnecessarily or excessively damage the cured rubber surface. Thus, materials such as dimethyl sulfoxide, dimethylformamide and tetrahydrofuron are generally not desired. The cyanuric acid itself is relatively insoluble in most diluents or solvents so that it is usually applied as a dispersion in an organic diluent such as, for example, ethyl acetate.

The cyanuric acid dispersion and/or solution can be applied to the cured rubber surface at ambient conditions, although it is sometimes preferred that the cured rubber surface has a temperature in the range of about 50° C. to about 95° C. in order to increase the rate of evaporation of the diluent of solvent.

Although one coat of the cyanuric acid solution can be applied, because each application typically results in a very thin coating, it is usually desired that from 1 to 5, more preferably from 2 to 4 coatings are applied for the purpose of providing good coverage of the rubber surface.

In practice, it is preferred that each individual cyanuric acid coat is dried before applying another coat. It is believed that the effective, ultimate resultant adhesive bond will be enhanced by such procedure.

It is considered that it is desirable to dry the cyanuric acid coating before applying the additional coat of resin because it is considered that a better bond can be obtained by elimination of residual solvent.

Typically, a coating of up to about 0.007 gms of acid have been deposited per square centimeter of cured rubber surface. The amount deposited is not considered particularly critical except that it is to be emphasized that the coating is thin yet adequately covers the rubber surface.

The acid coating can be dried at room temperature such as about 20° C. to about 30° C. although it may sometimes more desirable to dry the coating at a temperature of about 75° C. to about 100° C. in a hot air oven in order to reduce the drying time. The drying time at the higher temperature range should be limited in order to preserve and maintain a relatively high degree of tack of the coating.

The additional coating applied over the cyanuric acid coat is comprised of the phenol formaldehyde resole resin is applied as an organic solvent thereof. Various solvents can be used for this purpose which do not unnecessarily excessively damage the rubber as hereinbefore pointed out.

Although one coat of the resin can be used, because an individual coat is very thin, usually about 1 to 5 and preferably from 2 to 4 coats are preferred in order to adequately cover the cyanuric acid coat.

In practice, it is preferred that each individual resin coat is dried before applying another coat. It is believed that such practice enhances the resultant adhesive bonding effect.

Suitable solvents, or mixtures thereof, for the resin solution may be selected from, for example, liquid ketones such as acetone, methyl ethyl ketone, methyl isobutyl ketone as well as trichloroethylene, toluene, ethyl alcohol, and isopropanol and mixtures of such solvents.

Generally, the resin solution is applied as a concentration in the range of about 5 to about 20, preferably about 5 to about 15 weight percent solids.

The resin solution can be applied at about ambient conditions, such as about 20° C. to about 30° C., although it is preferred that the rubber surface temperature is about 50° C. to about 95° C. to shorten the drying time. The drying time at the higher temperature range should be limited in order to preserve and maintain a relatively high degree of tack for the coating.

The phenol formaldehyde resole resin is familiar to those having skill in such art and refers to the resultant products of at least partially condensing formaldehyde and a phenol alcohol, particularly phenol. Phenol formaldehyde resin is considered as being a major constituent in the solids portion of the solution where the remainder of the solids may be composed of minor amounts of other resins and polymers.

It was observed that it was important to dry the applied resin coating prior to application of the polyurethane reaction mixture in order to obtain better bonding.

The polyurethane reaction mixture is applied as a liquid under molding environment conditions to the coated, cured rubber surface. It is preferred that the coated rubber surface is about 30° to about 80° C. The reaction mixture is liquid primarily because the reactants are chosen so that the mixture is in a liquid form.

By the term molding environment conditions, it is meant that the liquid mixture is applied within a containment that has a shape suitable for the desired article to be obtained upon curing the liquid mixture to form a solid material such as a tire carcass, tire tread or other desired article such as an industrial product. In the molding environment it is contemplated that it may often be desirable to first place the cured rubber substrate such as cured rubber carcass or cured rubb.er tread into a suitable mold to which is then applied the liquid reaction mixture.

The liquid reaction mixture is then cured at a suitable temperature such as room or ambient temperature (20° C. to 30° C.), or at a temperature in the range of about 20° C. to about 130° C., although preferably it is cured at a temperature in the range of about 80° C. to about 120° C.

It is important to appreciate that the polyurethane is cured against the resin topcoat over the cyanuric acid coated cured rubber substrate, with the cured rubber being required to contain the diene polyol, preferably the polybutadiene polyol, to achieve the bonding effect.

The bonding mechanism in which the polyurethane is bonded to the cured rubber surface through the applied coatings is not fully understood. However, it has been observed that the addition of the diene polyol, particularly the polybutadiene polyol to the rubber composition, followed by sulfur curing the rubber to form the rubber substrate, substantially enhances the bonding of the polyurethane to the cured rubber surface through the step-wise applied coatings.

The degree of effective bonding was tested by a laboratory procedure. In such procedure, test samples as laminates of layers of 6"×1" (15 cm×2.5 cm) polyurethane ($\frac{1}{2}$" or 1.3 cm thick) and cured rubber ($\frac{1}{8}$" to $\frac{1}{4}$" 0.3 cm to 0.6 cm thick) are bonded through the sequentially applied coatings according to the method of this invention. The samples are tested at a series of temperatures, including 25° C. and 65° C., by a 180° peel test in which the layers of polyurethane and cured rubber are pulled apart with an Instron tester at a crosshead speed of 2 inches per minute and the force needed to pull them apart is measured and observed as pounds of force for the one inch wide sample and expressed as pounds per inch (lb/in).

In the tests, the rubber contained a tire cord reinforcement composed of cabled, or twisted, filaments or yarns, positioned essentially in a direction parallel to each other (weft cords) with occasional stabilizing, or warp, filaments positioned 90°, to the weft cords. This is a typical tire cord construction. In this test, two peel tests were conducted on the samples. In one test, the sample was peeled in a direction parallel to the weft cords and in the other test, the sample was peeled 90°, or perpendicular to the weft cord.

In accordance with the practice of this invention, such laminates of polyurethane to cured rubber have been observed to have a bond strength in the range of about 60 to at least about 120 pounds per inch (lb/in) at 25° C. (in one instance the rubber broke before the test was completed) and in the range of about 11 to at least about 55 (lb/in) at about 65° C. according to this test, depending upon whether the 180° peel was taken parallel or perpendicular to the weft cords. During the test, the indicated force varies in an oscillating manner, varying between high and low values, so that these indicated force ranges are simply the estimated averages of such oscillations. In practice, of course, other values may be obtained depending somewhat upon the nature of the rubber and polyurethane and characteristics of the interfacing coatings.

In the practice of this invention, the said cured rubber substrate surface to which the sequential coats are applied and the polyurethane adhered can for example, be of various cured rubber compositions. For example, they can be sulfur compositions comprised of at least one of natural rubber, synthetic cis 1,4-polyisoprene, cis 1,4-poly-butadiene, styrene/butadiene copolymer, butyl, chlorobutyl bromobutyl and EPDM rubber where it is to be understood that such rubbers are compounded with typical rubber compounding ingredients which conventionally include carbon black, zinc oxide, stearate, sulfur, accelerator(s) and about 0 to about 25, preferably about 0 to about 20 and optionally about 5 to about 20 phr (parts by weight per 100 parts by weight rubber) rubber processing oil as well as the required diene polyol. Other ingredients can also be included such as various antidegradants, pigments and conventional other compounding ingredients. It is generally desired that only a minimal of oil, if any, be contained in the cured rubber in order that a better bond can be obtained.

In the practice of this invention the said polyurethane reaction mixture is prepared according to methods known to those having skill in the polyurethane art. Various polyurethane reaction mixture recipes can be used, depending somewhat upon the cured polyurethane properties desired.

For example, a polyurethane reaction mixture may be comprised of (i) a prepolymer of at least one polyisocyanate having an average NCO content of about 2.1 to about 2.5 and a polymeric polyol selected from at least one of polyester polyol, polyether polyol and polybutadiene polyol having an average hydroxyl functionality of about 2 to about 3 and a molecular weight in the range of about 2000 to about 4000 where the NCO/OH ratio is in the range of about 1.5 to about 2.5 and (ii) a curative for said prepolymer selected from at least one diamine, preferably a primary diamine such as, for example, methylene dianiline, a sodium chloride complex with 4,4' methylene dianiline in dioctylphthalate, diethyl 2,4-diamine, trimethylene glycol di-para-amino benzoate and meta phenylene diamine or a monomeric diol such as, for example, ethylene glycol, 1,3-propane diol, 1,4-butane diol, hydroxy ethyl hydroquinone, and trimethylolpropane. A polycaprolactone derived from ε-caprolactone and a small amount of diglycidal ether has been found to be a particularly useful polyester polyol.

The ratio of primary amine groups of the diamine or hydroxyl groups of the monomeric diol to the excess of NCO groups over the OH groups of the prepolymer is typically in the range of about 0.75/1 to about 0.95/1.

Representative examples of various diisocyanates may include for example 1,6-hexamethylene diisocyanate, 1,10-decamethylene diisocyanate, 1,4-cyclohexylene diisocyanate, 4,4'-methylene-bis(cyclohexylisocyanate), 1,5-tetrahydronaphthalene diisocyanate, isophorone diisocyanate, the 1,4- and 2,6-toluene diisocyanates, m-phenylene diisocyanate, diphenylmethane-4,4'-diisocyanate, hydrogenated diphenylmethane-4,4'-diisocyanate, and 3,3'-dimentyl-4,4-bis phenylene diisocyanate, as well as the polyalkylene-polyarylene isocyanates as more particularly referred to in U.S. Pat. No. 2,683,730.

If desired, the polyurethane may be loaded with various fillers to enhance its physical properties. Thus, the cured polyurethane may contain from about 5 to about 100 weight percent of typical particular rubber reinforcing fillers, such as carbon black, titanium dioxide, zinc oxide, calcium carbonate, filler clays, silicas and coloring pigments.

The tires can be pneumatic when using an internal air pressure for support of the tire structure, semipneumatic when using internal air for a partial support although relying primarily on the tire's own structure for support or the tire can be solid such as for industrial tire application.

The practice of this invention is further illustrated by reference to the following examples which are intended to be representative rather than restrictive of the scope of the invention. Unless otherwise indicated, all parts and percentages are by weight.

EXAMPLE I

A circular cured rubber tire tread having a width of about 5 to 6 inches (about 12 to about 15 cm), a thickness of about 0.5 inch (1.3 cm) in its crown region and tapering to a point of no thickness in its shoulder regions and with an outside diameter of about 13 inches (33 cm) is prepared having an outer tread rubber portion, or layer, for ground contacting purposes and an integral, internally fabric reinforced inner rubber layer with an exposed inner surface.

The inner rubber layer is composed of a sulfur cured rubber composition comprised of natural rubber, styrene/butadiene rubber, about 10 phr hydroxyl terminated polybutadiene polyol reportedly having an hydroxyl functionality of about 2.3 and a molecular weight of about 2,800, obtained as R45M designation from Arco Chemical Co., about 17.25 phr rubber processing oil and conventional compounding ingredients including carbon black, sulfur, zinc oxide, zinc stearate, resin(s), antidegradant(s) and accelerator(s).

The inner, exposed surface of the said inner portion or layer of the cured rubber tread is cleaned by first buffing to roughen and abrade away a small portion of the layer followed by washing the abraded surface with methyl ethyl ketone and drying the cleaned rubber surface.

The cured rubber tread is heated to about 95° C.

To the cleaned heated inner cured rubber tread surface is first applied two coats of dispersion of cyanuric acid 3 percent solids in ethyl acetate obtained as 7701 from Hughson Chemicals of the Lord Corporation.

Each of the cyanuric acid coats is individually allowed to dry to remove the ethyl acetate solvent on the warm tread surface for about 10 minutes between each application.

To the dried cyanuric acid resultant coating is then applied a coating of a solution primarily composed of a phenol formaldehyde resole resin, at a concentration of about 10 percent solids, in a mixture of solvents understood to be toluene, methyl isobutyl ketone and trichloroethylene isopropanol and ethyl alcohol to which methyl ethyl ketone is added.

The phenol formaldehyde resin solution is obtained as Chemlok 218 which is described as being composed of the phenol formaldehyde resin and organic resins and polymers dissolved in an organic blend of solvents from Hughson Chemicals of the Lord Corporation.

The coated rubber tread after standing at room temperature (23° C.-25° C.) for about 30 minutes, is placed in a hot air oven for about 10 minutes at about 95° C. after which it is removed and placed in a 13 inch (33 cm) diameter tire mold (molding environment). Overheating is to be avoided in order to preserve tack.

A liquid polyurethane reaction system is cast onto the warm, coated inner surface of the cured rubber tread in the molding environment and cured at a temperature at about 125° C. at about 16 hours in a hot air oven. The liquid polyurethane reaction mixture is prepared by mixing a prepolymer with a curative according to the following recipe shown in Table 1 where the prepolymer has an NCO/OH ratio of about 2/1 and a free NCO content of about 2.3%. For the curative, a ratio of NH2/free NCO of about 0.95/1 is provided.

TABLE 1

| Material | Parts |
| --- | --- |
| A. Prepolymer | |
| Polycaprolactone polyol[1] | 100 |
| Diphenyl Methane Diisocyanate | 16.32 |
| B. Curative | |

TABLE 1-continued

| Material | Parts |
| --- | --- |
| Diamine[2] | 13.16 |

[1] A polyester polyol derived from ε-caprolactone and diglycidal ether and having a molecular weight of about 3000.
[2] A 50% 4,4'methylenedianiline/sodium chloride complex in dioctyl phthalate.

EXAMPLE II

Composites or test samples, of polyurethane bonded to a cured rubber substrate prepared by the exemplary method used in Example 1 for preparing the prospective tire, including the representative formulations except that some of the rubber substrates were not prepared with the polybutadiene polyol and, although all of the rubber substrate surfaces were cleaned, they were not all treated with the sequential coatings. The samples were tested according to the procedure hereinbefore described in this specification and both average and maximum bond strengths for a series of temperatures in the range of 23° C. and 65° C. were observed. The 180° peel test was conducted on the samples for both a parallel and perpendicular direction to the weft cord of the tire cord reinforcement contained in the cured rubber portion.

The results are shown in the following Table 2. Sample A is considered a control where no diene polyol had been added to the rubber and no surface coating had been applied, although the rubber surface had been cleaned. For Sample B the surface coatings were applied to the cleaned rubber surface but no diene polyol had been added to the rubber composition. For Sample C, no surface coating was applied to the cured rubber surface but the diene polyol had been added to the rubber composition. Sample D represents the practice of this invention where the diene polyol had been added to the rubber composition and the coatings had been sequentially applied to the cleaned, sulfur cured rubber surface.

TABLE 2

| | Bond Strengths (lb/in) | | | |
| --- | --- | --- | --- | --- |
| | Parallel to Cord | | Perpendicular to Cord | |
| Test Sample | 23° C. Ave/Max | 65° C. Ave/Max | 23° C. Ave/Max | 65° C. Ave/Max |
| A. No Polyol, No Coatings | 40/48.5 | 3/3.8 | 40/44 | 8/10.5 |
| B. Surface Coatings, No Polyol | 39/48 | 17/20 | 48/62.5 | 26/35 |
| C. Polyol, No Coatings | 80/102 | 9/12 | 79/96.5 | 22/29 |
| D. Polyol plus Surface Coatings | 100/134 | 10.5/13.5 | 66*/75* | 55/61 |

*The rubber portion of the sample tore or broke during the test.

Although the results of the peel test depend somewhat upon the alignment of the peel with the cord direction in the rubber composition, Table 2 clearly shows that the composite prepared according to this invention (Sample D) demonstrates an enhanced bond strength for the conditions tested.

Indeed, the enhanced bond strengths observed for test Sample D, representing this invention, shows a distinct advantage of utlizing both the inclusion of the diene polyol in the rubber composition and the sequentially applied prescribed coatings onto the cured rubber surface prior to polyurethane application solas compared to no utilization of polyol or coatings (Sample A), utilization of the surface coatings on the cured rubber surface but no polyol in the rubber (Sample B) or with utilization of the polyol in the rubber composition but no application of the surface coatings on the cured rubber surface (Sample C).

I claim:

1. A tire comprising a polyurethane carcass bonded to a cured rubber tread prepared according to the method which comprises the steps of:

(A) obtaining a circular cured rubber tire tread composed of an outer rubber tread portion and an inner rubber portion having an exposed inner tread surface, where said inner rubber portion is prepared by sulfur curing a rubber composition containing about 2 to about 20 phr of at least one hydroxyl terminated diene polyol selected from polybutadiene polyol and polyisoprene polyol, where said polyol is characterized by being liquid at 30° C., by having a hydroxyl functionality in the range of about 1.5 to about 3 and a molecular weight in the range of about 2000 to about 4000; and where said rubber composition further contains about 0 to about 25 phr of rubber processing oil, (B) cleaning the exposed inner surface of said inner tread portion, (C) applying at least one coating to said cleaned inner tread surface of a dispersion of cyanuric acid in a volatile organic diluent and drying the resultant coat.

2. A tire comprising a polyurethane tread bonded to a cured rubber carcass according to claim 1 where the said cured rubber surface is heated to a temperature in the range of about 50° C. to about 95° C. prior to application of the cyanuric acid dispersion and phenol formaldehyde resole resin solution, where each of said dispersion and said solution are applied an amount of about 2 to about 5 coatings and where each dispersion and each solution individual coat is dried prior to application of an additional coating; and where the cured rubber substrate surface has been prepared by sulfur curing a rubber composition comprised of at least one of natural rubber, synthetic cis 1,4-polyisoprene, cis 1,4-polybutadiene, styrene/butadiene copolymer, butyl, chlorobutyl bromobutyl and EPDM rubber and containing carbon black, zinc oxide, stearate and about 0 to about 25 phr rubber processing oil and about 8 to about 12 phr of said diene polyol where said polyol is a hydroxyl functionality of about 2 to about 2.5 and a molecular, weight in the range of about 2500 to about 3200.

3. A tire comprising a polyurethane tread bonded to a cured rubber carcass prepared according to the method which comprises the steps of:

(A) obtaining a toroidally shaped cured rubber tire carcass, said carcass having a circumferential, outer, exposed rubber portion, where said rubber portion is prepared by sulphur curing a rubber composition containing about 2 to about 20 phr of at least one hydroxyl terminated diene polyol selected from polybutadiene polyol and polyisoprene polyol, where said polyol is characterized by being liquid at 30° C., by having a hydroxyl functionality in the range of about 1.5 to about 3 and a molecular weight in the range of about 2000 to about 4000; and where said rubber composition further contains about 0 to about 25 phr of rubber processing oil, (B) cleaning the outer, exposed surface of the said outer rubber portion of said carcass, (C) applying at least one coating to said cleaned outer carcass surface as a dispersion of cyanuric acid in a volatile organic diluent and drying the resultant coat, (D) applying at least one additional overcoat to said coated surface as a solution comprising a phenol formaldehyde resin in an organic solvent and drying each individual coat, (E) applying a liquid polyurethane reaction mixture to said coated surface of the carcass in a molding environment having the shape of a desired tire tread, (F) curing said reaction mixture in said molding environment to form said composite as a polyurethane tread bonded to a cured rubber tire carcass through said sequentially applied coatings.

4. A tire comprising a polyurethane carcass bonded to a cured rubber tread according to claim 3 wherein said cured rubber tread is heated to a temperature in the range of about 50° C. to about 95° C. prior to application of the cyanuric acid dispersion and phenol formaldehyde resole resin solution, where eachof said dispersion and said solution are applied an amount of about 2 to about 5 coatings and where each dispersion and each solution individual coat is dried prior to application of an additional coating; and where the cured rubber substrate surface has been prepared by sulfur curing a rubber composition comprised of at least one of natural rubber, synthetic cis 1,4-polyisoprene, cis 1,4-polybutadiene, styrene/butadiene copolymer, butyl, chlorobutyl bromobutyl and EPDM rubber and containing carbon black, zinc oxide, stearate and about 0 to about 25 phr rubber processing oil and about 8 to about 12 phr of said diene polyol where said polyol is a hydroxyl functionality of about 2 to about 2.5 and a molecular, weight in the range of about 2500 to about 3200.

* * * * *